United States Patent
Zhao et al.

(10) Patent No.: US 12,295,007 B2
(45) Date of Patent: May 6, 2025

(54) METHOD FOR RESOURCE INDICATION AND TERMINAL DEVICE

(71) Applicant: GUANGDONG OPPO MOBILE TELECOMMUNICATIONS CORP., LTD., Guangdong (CN)

(72) Inventors: Zhenshan Zhao, Guangdong (CN); Huei-Ming Lin, South Yarra (AU); Yi Ding, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 414 days.

(21) Appl. No.: 17/812,172

(22) Filed: Jul. 12, 2022

(65) Prior Publication Data
US 2022/0361232 A1    Nov. 10, 2022

Related U.S. Application Data

(63) Continuation of application No. PCT/CN2020/074365, filed on Feb. 5, 2020.

(51) Int. Cl.
*H04W 72/23* (2023.01)
*H04W 72/20* (2023.01)

(52) U.S. Cl.
CPC .......... *H04W 72/23* (2023.01); *H04W 72/20* (2023.01)

(58) Field of Classification Search
CPC ..... H04L 5/001; H04L 5/0048; H04L 5/0098; H04L 5/14; H04L 5/1423; H04W 24/08; H04W 24/10; H04W 72/0453; H04W 72/23

See application file for complete search history.

(56) References Cited

U.S. PATENT DOCUMENTS

| | | | |
|---|---|---|---|
| 11,910,387 B2* | 2/2024 | Ganesan | H04L 1/08 |
| 2019/0190643 A1* | 6/2019 | Lee | H04W 72/12 |
| 2020/0029340 A1* | 1/2020 | He | H04W 72/25 |
| 2020/0229195 A1* | 7/2020 | Lien | H04L 5/001 |
| 2020/0275425 A1* | 8/2020 | Cao | H04L 1/0003 |
| 2020/0288486 A1* | 9/2020 | Kwak | H04L 5/0094 |
| 2020/0389900 A1* | 12/2020 | Lee | H04W 72/53 |
| 2021/0028896 A1* | 1/2021 | Yasukawa | H04W 72/04 |
| 2022/0095277 A1* | 3/2022 | Aiba | H04W 72/20 |

(Continued)

FOREIGN PATENT DOCUMENTS

| | | |
|---|---|---|
| CN | 108632782 | 10/2018 |
| CN | 109804691 | 5/2019 |

(Continued)

OTHER PUBLICATIONS

"3rd Generation Partnership Project; Technical Specification Group Radio Access Network; NR; Physical layer procedures for control (Release 17)," 3GPP TS 38.213, Mar. 2022, v17.1.0.

(Continued)

*Primary Examiner* — Eric Nowlin
(74) *Attorney, Agent, or Firm* — Hodgson Russ LLP

(57) ABSTRACT

Methods for resource indication and a terminal device are provided in implementations of the disclosure. The method includes the following. A first terminal device transmits a shared resource set to a second terminal device through first signaling, where the shared resource set indicates transmission resources for sidelink (SL) communication.

14 Claims, 5 Drawing Sheets

(56) References Cited

U.S. PATENT DOCUMENTS

| | | | | |
|---|---|---|---|---|
| 2022/0110143 | A1* | 4/2022 | Ganesan | H04W 72/20 |
| 2022/0217682 | A1* | 7/2022 | Peng | H04W 72/044 |
| 2022/0353846 | A1* | 11/2022 | Wang | H04W 72/0446 |
| 2023/0040691 | A1* | 2/2023 | Chae | H04W 72/23 |
| 2023/0107971 | A1* | 4/2023 | Kim | H04L 5/0094 370/329 |
| 2023/0156745 | A1* | 5/2023 | Zhao | H04W 72/40 370/330 |

FOREIGN PATENT DOCUMENTS

| | | | | |
|---|---|---|---|---|
| CN | 110267227 | | 9/2019 | |
| CN | 110731117 | | 1/2020 | |
| EP | 3509378 | A1 * | 7/2019 | H04L 1/0008 |
| EP | 3589053 | A2 * | 1/2020 | H04W 24/10 |
| EP | 3681228 | A1 * | 7/2020 | H04L 5/001 |
| EP | 3706496 | B1 * | 10/2021 | H04L 5/0053 |
| EP | 3962219 | | 3/2022 | |
| WO | 2019028847 | A1 | 2/2019 | |
| WO | 2019031808 | | 2/2019 | |
| WO | 2019148376 | A1 | 8/2019 | |
| WO | 2020011336 | A1 | 1/2020 | |

OTHER PUBLICATIONS

"3rd Generation Partnership Project; Technical Specification Group Radio Access Network; NR; Study on Vehicle-to-Everything (Release 16)," 3GPP TR 38.885, Nov. 2018, v1.0.0.

WIPO, International Search Report and Written Opinion for International Application No. PCT/CN2020/074365, Nov. 11, 2020.

Spreadtrum Communications, "Discussion on NR sidelink mode 1 resource allocation," R1-1906363, 3GPP TSG RAN WG1 #97, May 13-17, 2019.

NTT DOCOMO Inc., "Sidelink resource allocation mechanism," R1-1813320, 3GPP TSG RAN WG1 Meeting #95, Nov. 12-16, 2018.

EPO, Extended European Search Report for EP Application No. 20917527.2, Dec. 5, 2022.

"3rd Generation Partnership Project; Technical Specification Group Radio Access Network; NR; Multiplexing and channel coding (Release 16)," 3GPP TS 38.212, Dec. 2019, v16.0.0.

EPO, Communication for EP Application No. 20917527.2, Feb. 25, 2025.

* cited by examiner

MULTICAST

BROADCAST

METHOD FOR RESOURCE INDICATION AND TERMINAL DEVICE

CROSS-REFERENCE TO RELATED APPLICATION(S)

This application is a continuation of International Application No. PCT/CN2020/074365, filed Feb. 5, 2020, the entire disclosure of which is incorporated herein by reference.

TECHNICAL FIELD

The disclosure relates to the field of communication technology, and more particularly, to methods for resource indication and a terminal device.

BACKGROUND

Device to device (D2D) communication is a sidelink (SL)-based transmission technology. Unlink a conventional cellular system in which communication data is received or transmitted through a base station, a D2D system adopts a D2D direct communication mode, thus having higher spectrum efficiency and lower transmission latency. An internet of vehicles (IoV) system is based on a D2D transmission technology, and the D2D communication can include vehicle to vehicle (V2V) communication or vehicle to everything (V2X) communication. In new radio (NR)-V2X, autonomous driving may be supported, and a higher requirement for data interaction between vehicles is put forward, such as higher throughput, lower latency, higher reliability, a larger coverage range, a more flexible resource allocation, or the like.

In NR-V2X, multiple terminal devices may select same time-frequency resources due to lack of coordination between the terminal devices, and since a terminal device cannot perform transmission and reception simultaneously in SL communication, i.e., there is a half-duplex limit, each of the multiple terminal devices cannot receive data from other of the terminal devices. In addition, if the multiple terminal devices trigger resource selection or resource reselection at a same time point, the multiple terminal devices may perform resource selection based on same channel detection information and finally may select same time-frequency resources or partially-overlapped time-frequency resources, resulting in mutual interference.

SUMMARY

Methods for resource indication and a terminal device are provided in implementations of the disclosure.

In a first aspect, a method for resource indication is provided in implementations of the disclosure. The method includes the following. A first terminal device transmits a shared resource set to a second terminal device through first signaling, where the shared resource set indicates transmission resources for sidelink (SL) communication.

In a second aspect, a method for resource indication is provided in implementations of the disclosure. The method includes the following. A second terminal device receives a shared resource set transmitted by a first terminal device through first signaling, where the shared resource set indicates transmission resources for SL communication.

In a third aspect, a terminal device is provided in implementations of the disclosure. The terminal device includes a transceiver, a processor, and a memory storing a computer program. The computer program is executed by the processor to cause the transceiver to transmit a shared resource set to another terminal device through first signaling, where the shared resource set indicates transmission resources for SL communication.

BRIEF DESCRIPTION OF THE DRAWINGS

The following will give a brief introduction to the accompanying drawings used for illustrating implementations or the related art.

DETAILED DESCRIPTION

The following will describe technical solutions of implementations in the disclosure with reference to accompanying drawings.

In vehicle to everything (V2X) communication, X may broadly refer to any device with wireless receiving and transmitting functions, for example including but not limited to a slow-moving wireless apparatus, a fast-moving in-vehicle device, or a network control node with wireless transmitting and receiving functions. In new radio (NR)-V2X communication, autonomous driving may be supported, and a higher requirement for data interaction between vehicles is put forward, such as higher throughput, lower latency, higher reliability, a larger coverage range, a more flexible resource allocation, or the like.

Figure 1A:
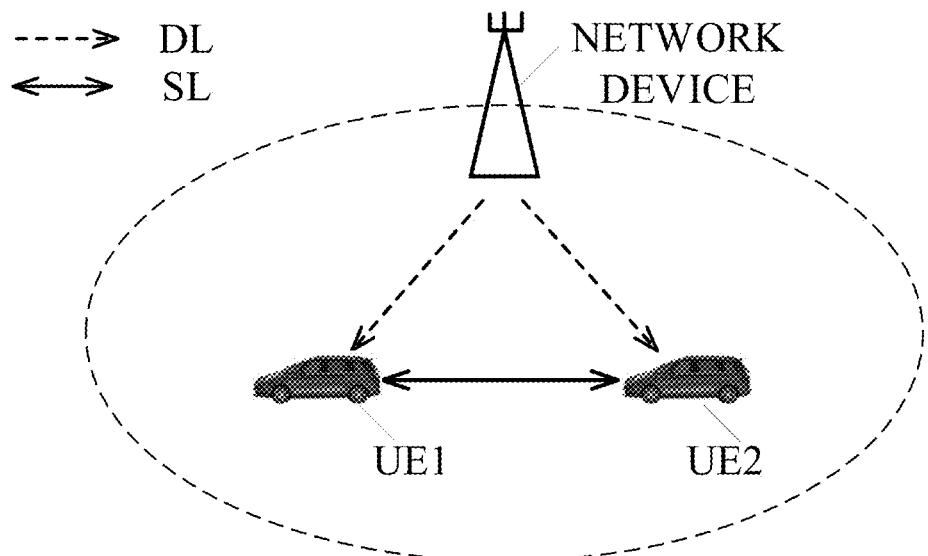
FIG. 1A is a schematic demonstration diagram illustrating a transmission mode being model A provided in implementations of the disclosure.
Figure 1B:
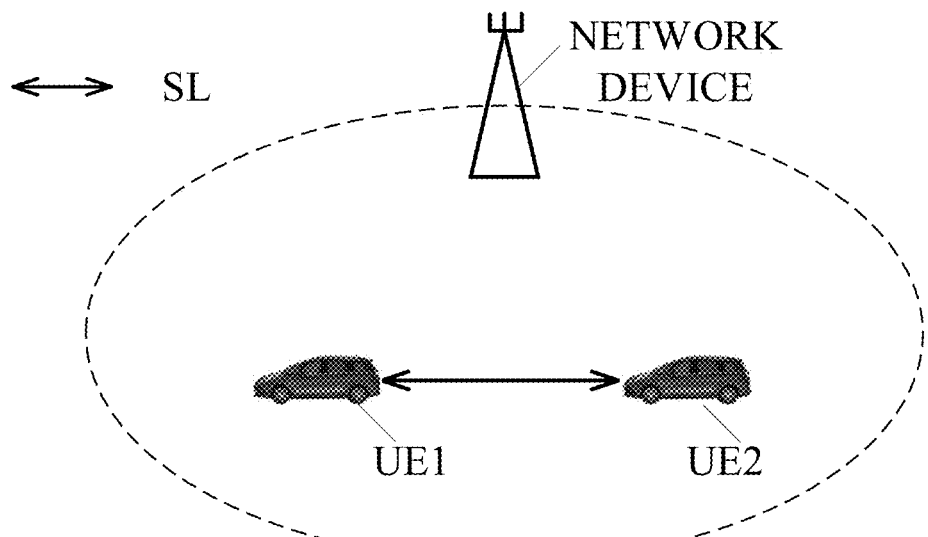
FIG. 1B is a schematic demonstration diagram illustrating a transmission mode being model B provided in implementations of the disclosure.

At present, two transmission modes for sidelink (SL) transmission, i.e., mode A and mode B, are defined in a third generation partnership project (3GPP). Referring to FIG. 1A and FIG. 1B, FIG. 1A is a schematic demonstration diagram illustrating a transmission mode being model A provided in implementations of the disclosure, and FIG. 1B is a schematic demonstration diagram illustrating a transmission mode being model B provided in implementations of the disclosure.

Mode A: a network device allocates a transmission resource to a terminal device, and the terminal device performs data transmission on an SL according to the resource allocated by the network device. The network device can allocate a resource for single transmission to the terminal device and can also allocate a resource for semi-static transmission to the terminal device.

Mode B: an in-vehicle terminal device selects a resource for data transmission from a resource pool.

Figure 1C:
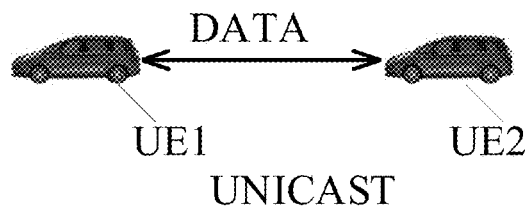
FIG. 1C is a schematic demonstration diagram illustrating a unicast transmission mode provided in implementations of the disclosure.
Figure 1D:
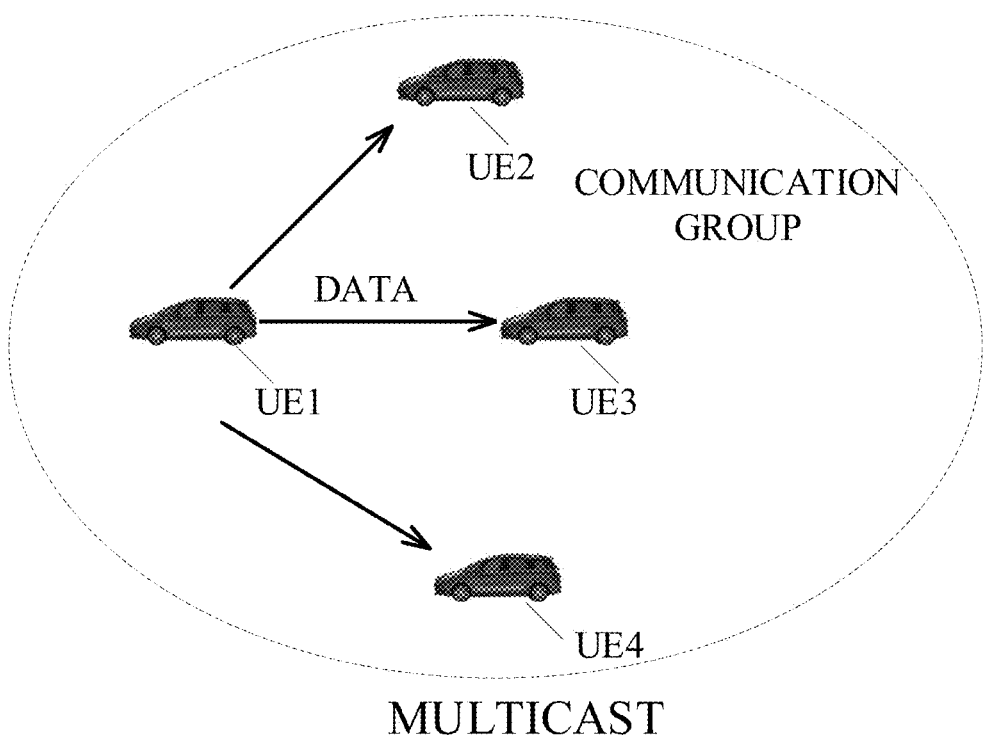
FIG. 1D is a schematic demonstration diagram illustrating a multicast transmission mode provided in implementations of the disclosure.
Figure 1E:
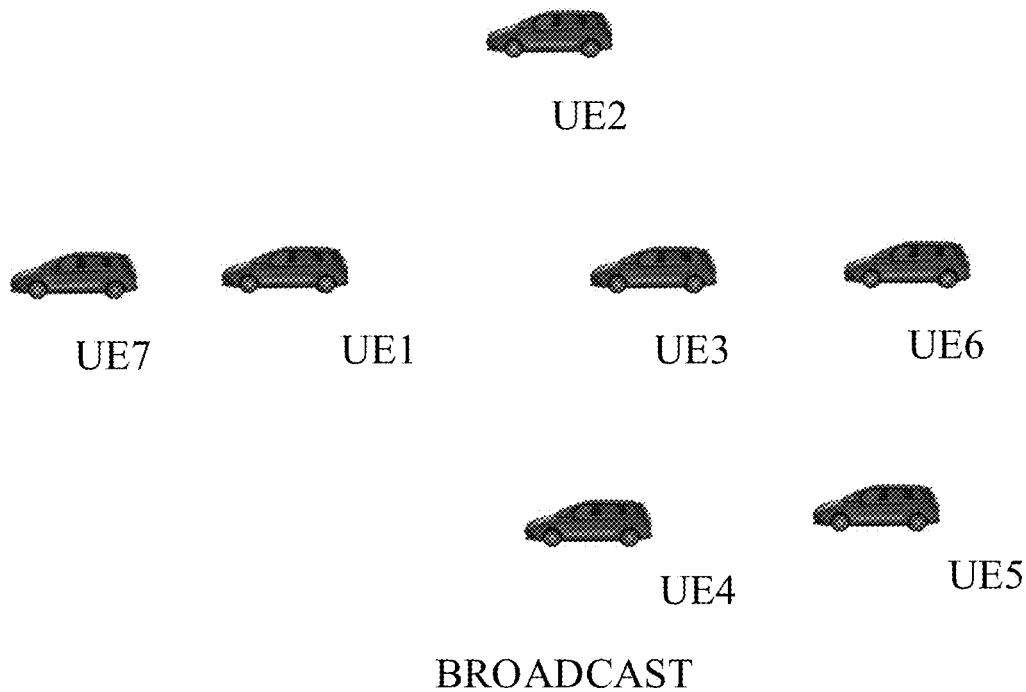
FIG. 1E is a schematic demonstration diagram illustrating a broadcast transmission mode provided in implementations of the disclosure.

In long term evolution (LTE)-V2X, a broadcast transmission mode is supported. In NR-V2X, autonomous driving may be supported, and thus a higher requirement for data interaction between vehicles is put forward, such as higher throughput, lower latency, higher reliability, a larger coverage range, a more flexible resource allocation, or the like. In NR-V2X, a unicast transmission mode and a multicast transmission mode are introduced. For unicast transmission, there is only one receiving terminal device. As illustrated in FIG. 1C, FIG. 1C is a schematic demonstration diagram illustrating a unicast transmission mode provided in implementations of the disclosure, where unicast transmission is performed between user equipment (UE) 1 and UE2. For multicast transmission, all terminal devices in a communication group or all terminal devices within a certain transmission distance each are a receiving terminal device. As illustrated in FIG. 1D, FIG. 1D is a schematic demonstration diagram illustrating a multicast transmission mode provided in implementations of the disclosure, where UE1, UE2, UE3, and UE4 constitute a communication group, UE1 transmits data, and other UEs in the group each are a receiving terminal device. For broadcast transmission, any terminal device is a receiving terminal device. As illustrated in FIG. 1E, FIG. 1E is a schematic demonstration diagram illustrating a broadcast transmission mode provided in implementations of the disclosure, where UE1 is a transmitting terminal device, and other UEs around UE1 each are a receiving terminal device.

In NR-V2X, two resource allocation modes, i.e., mode 1 and mode 2, are supported. In mode 1, a configured grant (CG) resource allocation mode is supported in SL transmission, i.e., a network device allocates an SL transmission resource to a terminal device, which corresponds to mode A above. Specifically, the network device can allocate an SL transmission resource to the terminal device through dynamic scheduling (DS) or allocate an SL transmission resource to the terminal device through CG. For CG resource allocation modes, two CG modes are mainly included, i.e., type-1 CG and type-2 CG.

Type-1 CG: the network device configures SL transmission resources for the terminal device through radio resource control (RRC) signaling, where transmission resources and transmission parameters that include all a time-domain resource, a frequency-domain resource, a demodulation reference signal (DMRS), a modulation and coding scheme (MCS), or the like are configured via the RRC signaling. When the terminal device receives the higher-layer parameter, the terminal device can immediately use the configured transmission parameters to perform SL transmission on configured time-frequency resources.

Type-2 CG: a 2-step resource configuration mode is adopted, i.e., a mode of RRC+downlink control information (DCI). At first, transmission resources and transmission parameters that include a period of a time-frequency resource, a redundancy version (RV), the number of retransmissions, a hybrid automatic repeat request (HARD) process number, or the like are configured via RRC signaling. Transmission on resources configured via type-2 CG is activated via DCI, and other transmission resources and transmission parameters that include a time-domain resource, a frequency-domain resource, an MCS, or the like are also configured via the DCI. Even if the terminal device receives the RRC signaling, the terminal device cannot immediately use the resources and the parameters configured by the higher-layer parameter to perform SL transmission, and the terminal device can perform SL transmission only when the terminal device receives corresponding DCI for activation and configuring other resources and transmission parameters. In addition, the network device can deactivate the configuration transmission through DCI, and the terminal device cannot use the transmission resources to perform SL transmission when DCI for deactivation is received.

In mode 1, a transmitting terminal device is required to be located within a coverage range of the network device and have an RRC connection with the network device. If the terminal device is located outside the coverage range of the network device or in an RRC-idle state, mode 1 cannot be used.

In mode 2, the terminal device autonomously selects a transmission resource for SL transmission from a resource pool, which corresponds to mode B above. The terminal device can obtain an available resource set in the resource pool by sensing. When the terminal device selects a transmission resource for data transmission from the resource set, the terminal device can reserve a transmission resource for next transmission, thereby avoiding that the resource is preempted by other users.

Mode 2 is applicable to all scenarios covered by the network device and in an RRC-connected state. However, in mode 2, multiple terminal devices may select same time resources due to lack of coordination between the terminal devices, and since a terminal device cannot perform transmission and reception simultaneously in SL communication, i.e., there is a half-duplex limit, each of the multiple terminal devices cannot receive data from other of the terminal devices. In addition, if the multiple terminal devices trigger resource selection or resource reselection at a same time point, the multiple terminal devices may perform resource selection based on same channel detection information and finally may select same time-frequency resources or partially-overlapped time-frequency resources, resulting in serious mutual interference. Therefore, a problem that how to transmit a resource set by a first terminal device to a second terminal device that performs resource selection in mode 2 needs to be solved.

For the above problem, a method for resource indication is provided in implementations of the disclosure. The method is applied to NR-V2X, where one terminal device can give assistance to resource selection performed by another or other terminal devices. Specifically, a first terminal device can transmit a shared resource set to a second terminal device. Then when the second terminal device performs resource selection, the second terminal device can take resources in the shared resource set as a reference, reducing a probability of a half-duplex limit and a resource collision. In addition, the terminal device illustrated in implementations of the disclosure may include various handheld devices with wireless communication functions, in-vehicle devices, wearable devices (such as smart watches, smart bracelets, pedometers, etc.), computing devices or other processing devices connected to wireless modems, UEs in various forms, etc. For convenience of illustration, the above-mentioned devices are collectively called terminal devices. The network device illustrated in implementations of the disclosure includes a base station, a core network device, or the like.

Figure 2A:
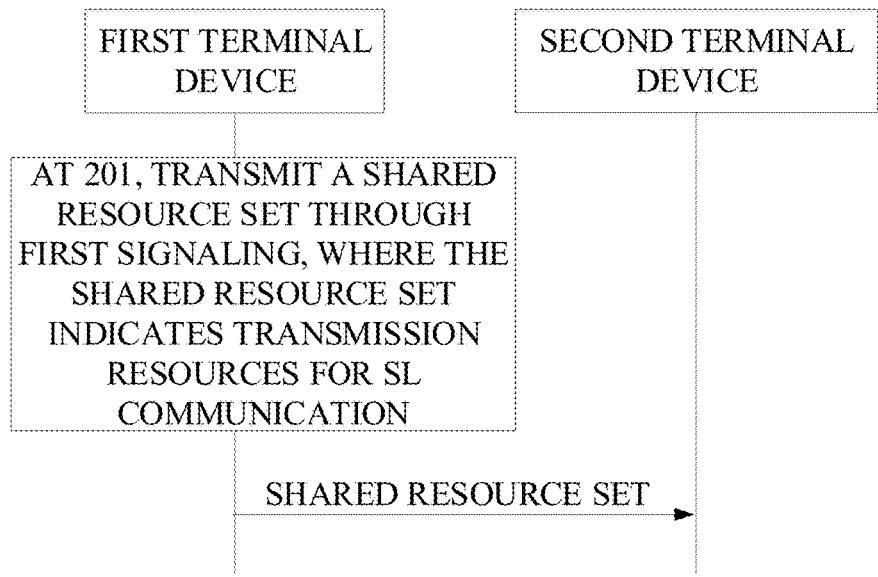
FIG. 2A is a schematic flow chart illustrating a method for resource indication provided in implementations of the disclosure.

Referring to FIG. 2A, FIG. 2A illustrates a method for resource indication provided in implementations of the disclosure. The method includes the following.

At 201, a first terminal device transmits a shared resource set to a second terminal device through first signaling, where the shared resource set indicates transmission resources for SL communication.

The first signaling may be any of: first RRC signaling, a sidelink control information (SCI) format 0-1 carried in a physical sidelink control channel (PSCCH), or an SCI format 0-2 carried in a physical data shared channel.

The shared resource set is used to assist the second terminal device in resource selection. Specifically, the shared resource set may include at least one of: at least one resource configured via type-1 CG, at least one resource configured via type-2 CG, frequency-domain resources in a reservation time that exceeds a shortest reservation time N and starts from a time point at which the first terminal device transmits the first RRC signaling, multiple same frequency-domain resources reserved periodically, or the like, which will not be limited herein.

The shared resource set can be transmitted through the first RRC signaling, through a specific bit field in SCI carried in the PSCCH, or through the SCI format 0-2.

After the first terminal device transmits the first terminal device to the second terminal device, the second terminal device can determine a transmission resource used by the second terminal device to perform SL communication according to the shared resource set, thereby avoiding serious transmission interference due to that the second terminal device selects same transmission resources as the first terminal device. In addition, the first terminal device can transmit to the second terminal device transmission resources that may be used by the first terminal device to perform transmission, and thus when the second terminal device performs resource selection, selection of resources in the shared resource set or selection of resources that overlap in a time domain with the resources in the shared resource set can be avoided, thereby decreasing a probability of a resource collision and reception failure due to half duplex.

In a possible implementation, before the first terminal device transmits the shared resource set to the second terminal device through the first signaling, the method further includes the following. The first terminal device determines the shared resource set according to a first indication from a network device, where the shared resource set includes at least one of: at least one resource configured via type-1 CG or at least one resource configured via type-2 CG.

Specifically, when the first terminal device works in mode 1, the first terminal device can determine the shared resource set according to the first indication from the network device, e.g., the first terminal device can determine the shared resource set according to the first indication from a base station.

The at least one resource configured via type-1 CG may include transmission resources and transmission parameters that include all a time-domain resource, a frequency-domain resource, a DMRS, an MCS, or the like.

The at least one resource configured via type-2 CG may include transmission resources and transmission parameters that include a period of a time-frequency resource, an RV, the number of retransmissions, an HARQ process number, or the like, and the at least one resource configured via type-2 CG may also include other transmission resources and transmission parameters that include a time-domain resource, a frequency-domain resource, an MCS, or the like.

In a possible implementation, before the first terminal device transmits the shared resource set to the second terminal device through the first signaling, the method further includes the following. The first terminal device selects the shared resource set from a resource pool according to channel detection information and periodically occupies same frequency-domain resources in the shared resource set.

Specifically, when the first terminal device works in mode 2, the first terminal device can select the shared resource set from the resource pool according to the channel detection information and periodically occupy the same frequency-domain resources in the shared resource set.

In a possible implementation, the first signaling is the first RRC signaling.

In a possible implementation, the shared resource set includes the frequency-domain resources in the reservation time that exceeds the shortest reservation time and starts from the time point at which the first terminal device transmits the first RRC signaling.

The first terminal device can transmit the shared resource set to the second terminal device through the first RRC signaling, where the first RRC signaling for example may be PC5 RRC signaling.

Specifically, the shared resource set may include the frequency-domain resources in the reservation time that exceeds the shortest reservation time N and starts from the time point at which the first terminal device transmits the PC5 RRC signaling, where a value of N can be determined by the first terminal device according to self-configuration or pre-configuration or can be set by system default.

In possible implementations of the disclosure, if the first terminal device reserves multiple frequency-domain resources in a resource reservation period, the shared resource set includes the multiple frequency-domain resources and frequency-domain resources same as the multiple frequency-domain resources in slots after the resource reservation period for the multiple frequency-domain resources.

Figure 2B:
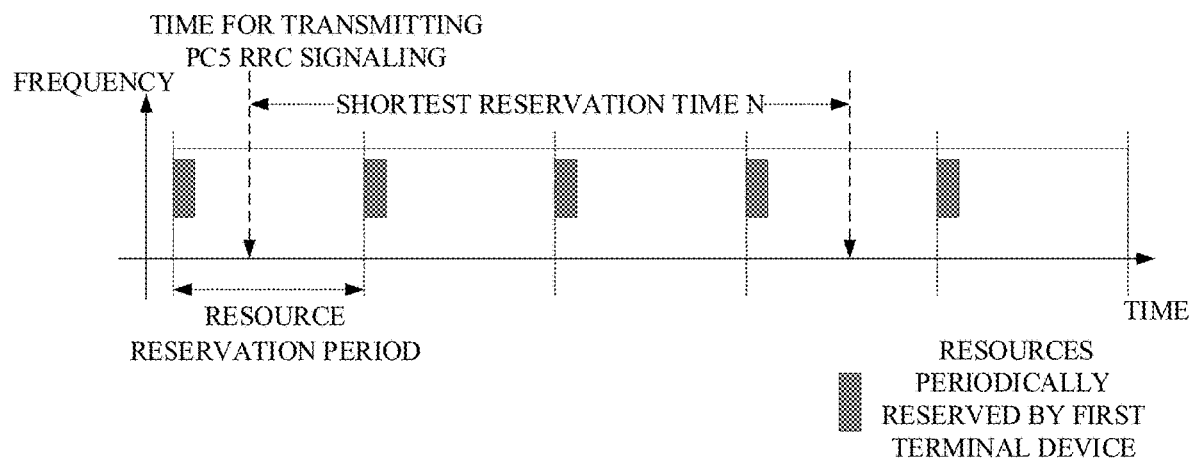
FIG. 2B is a schematic demonstration diagram illustrating transmission of a shared resource set by a first terminal device to a second terminal device through first radio resource control (RRC) signaling provided in implementations of the disclosure.

Referring to FIG. 2B, FIG. 2B is a schematic demonstration diagram illustrating transmission of the shared resource set by the first terminal device to the second terminal device through the first RRC signaling provided in implementations of the disclosure. For a service of periodic transmission, transmission resources for periodic transmission can be reserved. When the first terminal device works in mode 2, the first terminal device selects resources according to a channel detection result and periodically occupies same frequency-domain resources. The shared resource set includes the frequency-domain resources in the reservation time that exceeds the shortest reservation time N and starts from the time point at which the first terminal device transmits the PC5 RRC signaling. If the first terminal device reserves multiple frequency-domain resources in each resource reservation period, the multiple frequency-domain resources and periodically reserved frequency-domain resources same as the multiple frequency-domain resources each belong to the shared resource set.

Optionally, a time interval from a time point at which the first terminal device determines a first frequency-domain resource in the multiple frequency-domain resources to a time point at which the first terminal device transmits the first RRC signaling is less than or equal to a maximum time interval. The first terminal device triggers resource reselection if the first terminal device determines no resource for transmission of the first RRC signaling.

In specific implementations, the time interval from the time point at which the first terminal device determines the first frequency-domain resource to the time point at which the first terminal device transmits the first RRC signaling is less than or equal to a maximum time interval T. The first terminal device triggers resource reselection if the first terminal device determines no suitable resource for transmission of the first RRC signaling. A value of the maximum time interval T can be determined by the first terminal device according to self-configuration or pre-configuration or can be set by system default.

As can be seen that, the first terminal device can transmit to the second terminal device transmission resources that may be used by the first terminal device to perform transmission, and when the second terminal device performs resource selection, selection of resources in the shared resource set or selection of resources that overlap in a time domain with the resources in the shared resource set can be avoided, thereby decreasing a probability of a resource collision and reception failure due to half duplex.

In a possible implementation, before the first terminal device transmits the shared resource set to the second terminal device through the first signaling, the method further includes the following. The first terminal device determines an initial resource set according to a second indication from the network device and determines the shared resource set according to the initial resource set, where the shared resource set is a subset of the initial resource set.

The initial resource set is determined by the first terminal device and includes multiple candidate resources. In specific implementations, the first terminal device can first determine the initial resource set according to the second indication from the network device, determine part of resources in the initial resource set to constitute the shared resource set, and then transmit the shared resource set to the second terminal device.

In possible implementations, the initial resource set is represented as one or more resources configured via type-1 CG or a resource pool, and the shared resource set is represented as one or more resources configured via type-1 CG or a resource pool.

The one or more resources configured via type-1 CG may include the transmission resources and the transmission parameters that include all a time-domain resource, a frequency-domain resource, a DMRS, an MCS, or the like.

In possible implementations, the shared resource set includes SL transmission resources currently used by the first terminal device and SL resources not used by the first terminal device.

In specific implementations, the first terminal device can indicate the SL transmission resources currently used by the first terminal device and the SL resources not used by the first terminal device, respectively, and in response to reception of the shared resource set by the second terminal device, the second terminal device can give priority to selection of resources that have no conflict with the SL transmission resources used by the first terminal device, thereby avoiding a resource collision between the first terminal device and the second terminal device or a half-duplex limit.

In a possible implementation, the first signaling is SCI carried in a PSCCH.

In a possible implementation, the SCI includes at least one of: M1 time-frequency-domain-resource indication fields, where M1 is a positive integer; a resource-reservation-period indication field indicating a reservation period for each time-frequency-domain resource indicated by each time-frequency-domain-resource indication field; or a resource-reservation-period-number indication field indicating the number of reservation periods for time-frequency-domain resources indicated by each time-frequency-domain-resource indication filed.

In specific implementations, the first terminal device can transmit the shared resource set to the second terminal device through the SCI carried in the PSCCH.

M1 is the number of the time-frequency-domain-resource indication fields.

In possible implementations, each of the time-frequency-domain-resource indication fields includes 5 bits indicating a location of each of n slots, and $$\left\lceil \log_2\left(\frac{N_{subC}^{SL}(N_{subC}^{SL}+1)}{2}\right)\right\rceil$$

bits indicating a start location of a frequency-domain resource in each of the n slots and the number of sub-channels in the frequency-domain resource in each of the n slots, where n≤2. Alternatively, each of the time-frequency-domain-resource indication fields includes 9 bits indicating a location of each of m slots, and $$\left\lceil \log_2\left(\frac{N_{subC}^{SL}(N_{subC}^{SL}+1)(2N_{subC}^{SL}+1)}{6}\right)\right\rceil$$

bits indicating a start location of a frequency-domain resource in each of the m slots and the number of sub-channels in the frequency-domain resource in each of them slots, where m≤3, and $N_{subC}^{SL}$ represents the number of sub-channels in a current resource pool.

For example, each of the time-frequency-domain-resource indication fields includes 5 bits indicating the location of each of the n slots, and $$\left\lceil \log_2\left(\frac{N_{subC}^{SL}(N_{subC}^{SL}+1)}{2}\right)\right\rceil$$

bits indicating the start location of the frequency-domain resource in each of the n slots and the number of the sub-channels in the frequency-domain resource in each of the n slots, where n≤2.

For another example, each of the time-frequency-domain-resource indication fields includes 9 bits indicating the location of each of the m slots, and $$\left\lceil \log_2\left(\frac{N_{subC}^{SL}(N_{subC}^{SL}+1)(2N_{subC}^{SL}+1)}{6}\right)\right\rceil$$

bits indicating the start location of the frequency-domain resource in each of the m slots and the number of the sub-channels in the frequency-domain resource in each of the m slots, where m≤3, and $N_{subC}^{sL}$ represents the number of the sub-channels in the current resource pool.

The number of the time-frequency-domain-resource indication fields is determined according to the maximum number of retransmissions allowed by the current resource pool.

A value of M1 can be determined by the first terminal device and the second terminal device according to configured signaling or pre-configured signaling. Specifically, the number M1 of the time-frequency-domain resource indication fields is $$\left\lceil \frac{R}{2} \right\rceil$$

on condition mat each of me time-frequency-domain-resource indication fields indicates two time-frequency-domain resources, and the number M1 of the time-frequency-domain resource indication fields is $$\left\lceil \frac{R}{3} \right\rceil$$

on condition that each of the time-frequency-domain-resource indication field indicates three time-frequency-domain resources, where R is the maximum number of retransmissions allowed by the current resource pool.

Optionally, the total number of bits of the SCI can be different from the number of bits of an SCI format 0-1. A size of time-frequency-domain resources occupied by the PSCCH carrying the SCI can be different from that of time-frequency-domain resources occupied by a PSCCH carrying the SCI format 0-1.

In a possible implementation, bit fields in the SCI are the same as bit fields in the SCI format 0-1, and a size of the bit fields in the SCI is the same as that of time-frequency-domain resources occupied by the PSCCH carrying the SCI.

In possible implementations of the disclosure, if the second terminal device receives third RRC signaling from the first terminal device, and the third RRC signaling indicates that reserved bits of the SCI format 0-1 are in an activated state, or if configured signaling or pre-configured signaling from the network device indicates that the reserved bits of the SCI format 0-1 in the current resource pool are in the activated state, the second terminal device takes the reserved bits as the number of reservation periods for time-frequency-domain reservation resources.

For example, if the second terminal device receives a time-frequency resource indicated by the SCI format 0-1, the time-frequency resource is located in slot n, a reservation period for the time-frequency resource is reservation period P, and a decimal representation of a reserved bit field is D, the second terminal device can determine that the first terminal device reserves same frequency-domain resources in slots n+p, n+2*p, . . . n+(D+1)*p.

In possible implementations, the shared resource set includes the SL transmission resources currently used by the first terminal device or a superset of the SL transmission resources currently used by the first terminal device.

In a possible implementation, the first signaling is an SCI format 0-2.

In a possible implementation, the SCI format 0-2 includes M2 groups of bit fields, M2 is a positive integer, the number of the groups of the bit fields is greater than or equal to a first value, and each of the groups of the bit fields includes at least one of: a time-frequency-domain-resource indication field, a resource-reservation-period indication field indicating a reservation period for each time-frequency-domain resource indicated by the time-frequency-domain-resource indication field, or a resource-reservation-period-number indication field indicating the number of reservation periods for time-frequency-domain resources indicated by the time-frequency-domain-resource indication field.

M2 is the number of the groups of the bit fields.

In specific implementations, the first terminal device can transmit the shared resource set to the second terminal device through the SCI format 0-2, where the SCI format 0-2 includes the M2 groups of the bit fields.

Each of the time-frequency-domain-resource indication fields includes 5 bits indicating a location of each of n slots, and $$\left\lceil \log_2\left( \frac{N_{subC}^{SL}(N_{subC}^{SL}+1)}{2} \right) \right\rceil$$

bits indicating a start location of a frequency-domain resource in each of the n slots and the number of sub-channels in the frequency-domain resource in each of the n slots, where n≤2. Alternatively, each of the time-frequency-domain-resource indication fields includes 9 bits indicating a location of each of m slots, and $$\left\lceil \log_2\left( \frac{N_{subC}^{SL}(N_{subC}^{SL}+1)(2N_{subC}^{SL}+1)}{6} \right) \right\rceil$$

bits indicating a start location of a frequency-domain resource in each of the m slots and the number of sub-channels in the frequency-domain resource in each of the m slots, where m≤3, and $N_{subC}^{SL}$ represents the number of the sub-channels in the current resource pool.

For example, each of the time-frequency-domain-resource indication fields includes 5 bits indicating the location of each of the n slots, and $$\left\lceil \log_2\left( \frac{N_{subC}^{SL}(N_{subC}^{SL}+1)}{2} \right) \right\rceil$$

bits indicating the start location of the frequency-domain resource in each of the n slots and the number of the sub-channels in the frequency-domain resource in each of the n slots, where n≤2.

For another example, each of the time-frequency-domain-resource indication fields includes 9 bits indicating the location of each of the m slots, and $$\left\lceil \log_2\left( \frac{N_{subC}^{SL}(N_{subC}^{SL}+1)(2N_{subC}^{SL}+1)}{6} \right) \right\rceil$$

bits indicating the start location of the frequency-domain resource in each of the m slots and the number of the sub-channels in the frequency-domain resource in each of the m slots, where m≤3, and $N_{subC}^{SL}$ represents the number of the sub-channels in the current resource pool.

The number of the groups of the bit fields is determined according to the maximum number of retransmissions allowed by the current resource pool.

Specifically, the number M2 of the groups of the bit fields is $$\left\lceil \frac{R-1}{2} \right\rceil$$

on condition that the time-frequency-domain-resource indication field indicates two time-frequency-domain resources, and the number M2 of the groups of the bit fields is $$\left\lceil \frac{R-1}{3} \right\rceil$$

on condition that the time-frequency-domain-resource indication field indicates three time-frequency-domain resources, where R is the maximum number of retransmissions allowed by the current resource pool.

Optionally, if the SCI format 0-2 includes no resource-reservation-period indication field, reservation periods for resources indicated by the SCI format 0-2 are the same as reservation periods for resources indicated by the SCI format 0-1 that schedules transmission of the SCI format 0-2, and the number of the reservation periods for the resources indicated by the SCI format 0-1 is the same as that of the reservation periods for the resources indicated by the resource-reservation-period-number indication field in the SCI format 0-2.

Optionally, whether the SCI format 0-2 includes multiple groups of bit fields is indicated by second RRC signaling that is transmitted by the first terminal device to the second terminal device, or indicated by configured signaling or pre-configured signaling from the network device.

Optionally, whether the SCI format 0-2 includes the multiple groups of the bit fields is indicated by the SCI format 0-1 that schedules transmission of the SCI format 0-2, specifically, indicated by a specific state of a reserved bit field in the SCI format 0-1.

In a possible implementation, the SCI format 0-2 includes at least the resource-reservation-period-number indication field.

For example, if the second terminal device receives a time-frequency resource indicated by the SCI format 0-1, the time-frequency resource is located in slot n, a reservation period for the time-frequency resource is reservation period P, and the number of resource reservation periods indicated by the SCI format 0-2 is D, the second terminal device can determine that the first terminal device reserves same frequency-domain resources in slots n+p, n+2*p, n+(D+1)*p.

Optionally, whether the SCI format 0-2 includes the reservation-period-number indication field is indicated by the second RRC signaling that is transmitted by the first terminal device to the second terminal device, or indicated by the configured signaling or the pre-configured signaling from the network device.

Optionally, whether the SCI format 0-2 includes the reservation-period-number indication field is indicated by the SCI format 0-1 that schedules transmission of the SCI format 0-2, specifically, indicated by the specific state of the reserved bit field in the SCI format 0-1.

Figure 3:
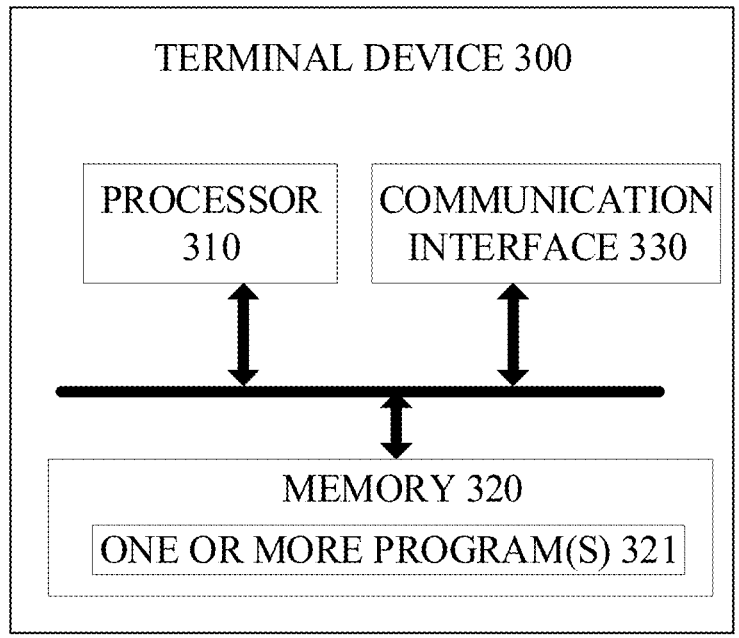
FIG. 3 is a schematic structural diagram illustrating a terminal device provided in implementations of the disclosure.

In consistence with the implementations in FIG. 2A, referring to FIG. 3, FIG. 3 is a schematic structural diagram illustrating a terminal device 300 provided in implementations of the disclosure. As illustrated in FIG. 3, the terminal device 300 includes a processor 310, a memory 320, a communication interface 330, and one or more program (s) 321, where the one or more program (s) 321 is stored in the memory 320 and is configured to be performed by the processor 310, and the one or more program (s) 321 includes instructions used for performing the following operations.

Transmit a shared resource set to a second terminal device through first signaling, where the shared resource set indicates transmission resources for SL communication.

It can be seen that, in implementations of the disclosure, a first terminal device transmits the shared resource set to the second terminal device through the first signaling, where the shared resource set indicates transmission resources for SL communication. As such, when the second terminal device performs resource selection, the second terminal device can take the resources in the shared resource set as a reference, for example, can avoid selecting resources in the shared resource set or selecting resources that overlap in a time domain with the resources in the shared resource set, thereby decreasing a probability of a resource collision and reception failure due to half duplex.

In a possible implementation, the first signaling is first RRC signaling.

In a possible implementation, the shared resource set includes frequency-domain resources in a reservation time that exceeds a shortest reservation time and starts from a time point at which the first terminal device transmits the first RRC signaling.

In a possible implementation, on condition that the first terminal device reserves multiple frequency-domain resources in a resource reservation period, the shared resource set includes the multiple frequency-domain resources and frequency-domain resources same as the multiple frequency-domain resources in slots after the resource reservation period for the multiple frequency-domain resources.

In a possible implementation, a time interval from a time point at which the first terminal device determines a first frequency-domain resource in the multiple frequency-domain resources to a time point at which the first terminal device transmits the first RRC signaling is less than or equal to a maximum time interval. The first terminal device triggers resource reselection on condition that the first terminal device determines no resource for transmission of the first RRC signaling.

In a possible implementation, before transmitting the shared resource set to the second terminal device through the first signaling, the one or more program (s) 321 further includes instructions used for performing the following operations. Determine the shared resource set according to a first indication from a network device, where the shared resource set includes at least one of: at least one resource configured via type-1 CG or at least one resource configured via type-2 CG.

In a possible implementation, before transmitting the shared resource set to the second terminal device through the first signaling, the one or more program (s) 321 further includes instructions used for performing the following operations. Select the shared resource set from a resource pool according to channel detection information, and periodically occupy same frequency-domain resources in the shared resource set.

In a possible implementation, the first signaling is the first RRC signaling, and before transmitting the shared resource set to the second terminal device through the first signaling, the one or more program (s) 321 further includes instructions used for performing the following operations. Determine an initial resource set according to a second indication from the network device, and determine the shared resource set according to the initial resource set, where the shared resource set is a subset of the initial resource set.

In a possible implementation, the initial resource set is represented as one or more resources configured via type-1 CG or a resource pool, and the shared resource set is represented as one or more resources configured via type-1 CG or a resource pool.

In a possible implementation, the shared resource set includes SL transmission resources currently used by the first terminal device and SL resources not used by the first terminal device.

In a possible implementation, the first signaling is SCI carried in a PSCCH.

In a possible implementation, the SCI includes at least one of: M1 time-frequency-domain-resource indication fields, where M1 is a positive integer; a resource-reservation-period indication field indicating a reservation period for each time-frequency-domain resource indicated by each time-frequency-domain-resource indication field; or a resource-reservation-period-number indication field indicating the number of reservation periods for time-frequency-domain resources indicated by each time-frequency-domain-resource indication filed.

In a possible implementation, each of the time-frequency-domain-resource indication fields includes 5 bits indicating a location of each of n slots, and $$\left\lceil \log_2\left(\frac{N_{subC}^{SL}(N_{subC}^{SL}+1)}{2}\right) \right\rceil$$

bits indicating a start location of a frequency-domain resource in each of the n slots and the number of sub-channels in the frequency-domain resource in each of the n slots, where n≤2. Alternatively, each of the time-frequency-domain-resource indication fields includes 9 bits indicating a location of each of m slots, and $$\left\lceil \log_2\left(\frac{N_{subC}^{SL}(N_{subC}^{SL}+1)(2N_{subC}^{SL}+1)}{6}\right) \right\rceil$$

bits indicating a start location of a frequency-domain resource in each of the m slots and the number of sub-channels in the frequency-domain resource in each of them slots, where m≤3, and $N_{subC}^{SL}$ represents the number of sub-channels in a current resource pool.

In a possible implementation, the number of the time-frequency-domain-resource indication fields is determined according to the maximum number of retransmissions allowed by the current resource pool.

In a possible implementation, the number M1 of the time-frequency-domain resource indication fields is $$\left\lceil \frac{R}{2} \right\rceil$$

on condition that each of the time-frequency-domain-resource indication fields indicates two time-frequency-domain resources, and the number M1 of the time-frequency-domain resource indication fields is $$\left\lceil \frac{R}{3} \right\rceil$$

on condition that each of the time-frequency-domain-resource indication field indicates three time-frequency-domain resources, where R is the maximum number of retransmissions allowed by the current resource pool.

In a possible implementation, the total number of bits of the SCI is different from the number of bits of an SCI format 0-1. A size of time-frequency-domain resources occupied by the PSCCH carrying the SCI is different from that of time-frequency-domain resources occupied by a PSCCH carrying the SCI format 0-1.

In a possible implementation, bit fields in the SCI are the same as bit fields in an SCI format 0-1, and a size of the bit fields in the SCI is the same as that of time-frequency resources occupied by the PSCCH carrying the SCI.

In a possible implementation, the shared resource set includes SL transmission resources currently used by the first terminal device or a superset of the SL transmission resources currently used by the first terminal device.

In a possible implementation, the first signaling is an SCI format 0-2.

In a possible implementation, the SCI format 0-2 includes M2 groups of bit fields, M2 is a positive integer, the number of the groups of the bit fields is greater than or equal to a first value, and each of the groups of the bit fields includes at least one of: a time-frequency-domain-resource indication field, a resource-reservation-period indication field indicating a reservation period for each time-frequency-domain resource indicated by the time-frequency-domain-resource indication field, or a resource-reservation-period-number indication field indicating the number of reservation periods for time-frequency-domain resources indicated by the time-frequency-domain-resource indication field.

In a possible implementation, the number of the groups of the bit fields is determined according to the maximum number of retransmissions allowed by the current resource pool.

In a possible implementation, the number M2 of the groups of the bit fields is $$\left\lceil \frac{R-1}{2} \right\rceil$$

on condition that the time-frequency-domain-resource indication field indicates two time-frequency-domain resources, and the number M2 of the groups of the bit fields is $$\left\lceil \frac{R-1}{3} \right\rceil$$

on condition that the time-frequency-domain-resource indication field indicates three time-frequency-domain resources, where R is the maximum number of retransmissions allowed by the current resource pool.

In a possible implementation, on condition that the SCI format 0-2 includes no resource-reservation-period indication field, reservation periods for resources indicated by the SCI format 0-2 are the same as reservation periods for resources indicated by an SCI format 0-1 that schedules transmission of the SCI format 0-2, and the number of the reservation periods for the resources indicated by the SCI format 0-1 is the same as that of the reservation periods for the resources indicated by the resource-reservation-period-number indication field in the SCI format 0-2.

In a possible implementation, whether the SCI format 0-2 includes multiple groups of bit fields is indicated by second RRC signaling that is transmitted by the first terminal device to the second terminal device, or indicated by configured signaling or pre-configured signaling from the network device.

In a possible implementation, whether the SCI format 0-2 includes the multiple groups of the bit fields is indicated by the SCI format 0-1 that schedules transmission of the SCI format 0-2.

In a possible implementation, the SCI format 0-2 includes at least the resource-reservation-period-number indication filed.

In a possible implementation, whether the SCI format 0-2 includes the reservation-period-number indication field is indicated by second RRC signaling that is transmitted by the first terminal device to the second terminal device, or indicted by configured signaling or pre-configured signaling from the network device.

In a possible implementation, whether the SCI format 0-2 includes the reservation-period-number indication field is indicated by the SCI format 0-1 that schedules transmission of the SCI format 0-2.

Figure 4:
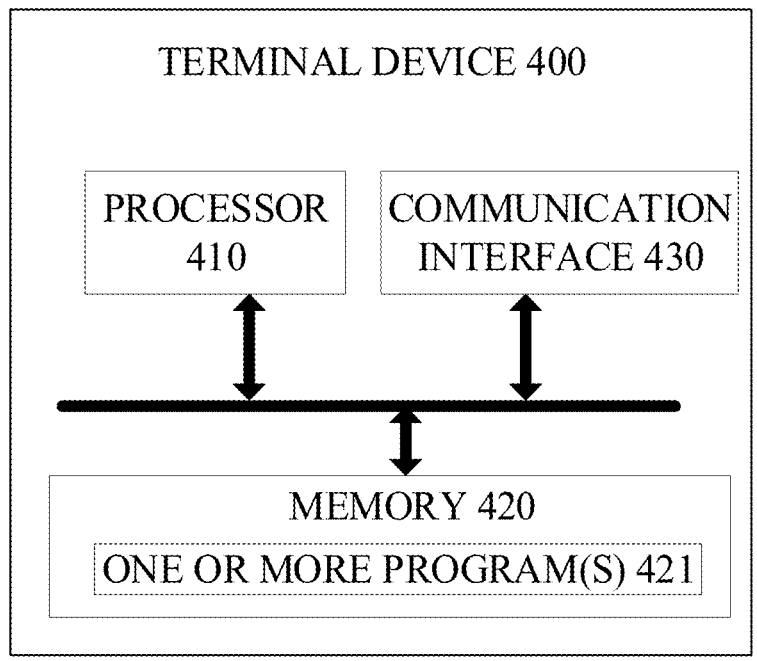
FIG. 4 is a schematic structural diagram illustrating a terminal device provided in implementations of the disclosure.

Referring to FIG. 4, FIG. 4 is a schematic structural diagram illustrating a terminal device 400 provided in implementations of the disclosure. As illustrated in FIG. 4, the terminal device 400 includes a processor 410, a memory 420, a communication interface 430, and one or more program (s) 421, where the one or more program (s) 421 is stored in the memory 420 and is configured to be performed by the processor 410, and the one or more program (s) 421 includes instructions used for performing the following operations.

Receive a shared resource set transmitted by a first terminal device through first signaling, where the shared resource set indicates transmission resources for SL communication.

It can be seen that, in implementations of the disclosure, a second terminal device receives the shared resource set transmitted by the first terminal device through the first signaling, where the shared resource set indicates transmission resources for SL communication. As such, when the second terminal device performs resource selection, the second terminal device can take the resources in the shared resource set as a reference, for example, can avoid selecting resources in the shared resource set or selecting resources that overlap in a time domain with the resources in the shared resource set, thereby decreasing a probability of a resource collision and reception failure due to half duplex.

In a possible implementation, the first signaling is first RRC signaling.

In a possible implementation, the shared resource set includes frequency-domain resources in a reservation time that exceeds a shortest reservation time and starts from a time point at which the first terminal device transmits the first RRC signaling.

In a possible implementation, on condition that in a resource reservation period multiple frequency-domain resources reserved by the first terminal device are included, the shared resource set includes the multiple frequency-domain resources and frequency-domain resources same as the multiple frequency-domain resources in slots after the resource reservation period for the multiple frequency-domain resources.

In a possible implementation, a time interval from a time point at which the first terminal device determines a first frequency-domain resource in the multiple frequency-domain resources to a time point at which the first terminal device transmits the first RRC signaling is less than or equal to a maximum time interval. The first terminal device triggers resource reselection on condition that the first terminal device determines no resource for transmission of the first RRC signaling.

In a possible implementation, the shared resource set includes SL transmission resources currently used by the first terminal device and SL resources not used by the first terminal device.

In a possible implementation, the first signaling is SCI carried in a PSCCH.

In a possible implementation, the SCI includes at least one of: M1 time-frequency-domain-resource indication fields, where M1 is a positive integer; a resource-reservation-period indication field indicating a reservation period for each time-frequency-domain resource indicated by each time-frequency-domain-resource indication field; or a resource-reservation-period-number indication field indicating the number of reservation periods for time-frequency-domain resources indicated by each time-frequency-domain-resource indication filed.

In a possible implementation, each of the time-frequency-domain-resource indication fields includes 5 bits indicating a location of each of n slots, and $$\left\lceil \log_2\left(\frac{N_{subC}^{SL}(N_{subC}^{SL}+1)}{2}\right)\right\rceil$$

bits indicating a start location of a frequency-domain resource in each of the n slots and the number of sub-channels in the frequency-domain resource in each of the n slots, where n≤2. Alternatively, each of the time-frequency-domain-resource indication fields includes 9 bits indicating a location of each of m slots, and $$\left\lceil \log_2\left(\frac{N_{subC}^{SL}(N_{subC}^{SL}+1)(2N_{subC}^{SL}+1)}{6}\right)\right\rceil$$

bits indicating a start location of a frequency-domain resource in each of the m slots and the number of sub-channels in the frequency-domain resource in each of them slots, where m≤3, and $N_{subC}^{SL}$ represents the number of sub-channels in a current resource pool.

In a possible implementation, the number of the time-frequency-domain-resource indication fields is determined according to the maximum number of retransmissions allowed by the current resource pool.

In a possible implementation, the number M1 of the time-frequency-domain resource indication fields is $$\left\lceil \frac{R}{2} \right\rceil$$

on condition that each of the time-frequency-domain-resource indication fields indicates two time-frequency-domain resources, and the number M1 of the time-frequency-domain resource indication fields is $$\left\lceil \frac{R}{3} \right\rceil$$

on condition that each of the time-frequency-domain-resource indication field indicates three time-frequency-domain resources, where R is the maximum number of retransmissions allowed by the current resource pool.

In a possible implementation, the total number of bits of the SCI is different from the number of bits of an SCI format 0-1. A size of time-frequency-domain resources occupied by the PSCCH carrying the SCI is different from that of time-frequency-domain resources occupied by a PSCCH carrying the SCI format 0-1.

In a possible implementation, the first signaling is the SCI carried in the PSCCH, bit fields in the SCI are the same as bit fields in an SCI format 0-1, and a size of the bit fields in the SCI is the same as that of time-frequency resources occupied by the PSCCH carrying the SCI.

In a possible implementation, on condition that the second terminal device receives third RRC signaling from the first terminal device, and the third RRC signaling indicates that reserved bits of the SCI format 0-1 are in an activated state, or on condition that configured signaling or pre-configured signaling from a network device indicates that the reserved bits of the SCI format 0-1 in the current resource pool are in the activated state, the second terminal device takes the reserved bits as the number of reservation periods for time-frequency-domain reservation resources.

In a possible implementation, the shared resource set includes SL transmission resources currently used by the first terminal device or a superset of the SL transmission resources currently used by the first terminal device.

In a possible implementation, the first signaling is an SCI format 0-2.

In a possible implementation, the SCI format 0-2 includes M2 groups of bit fields, M2 is a positive integer, the number of the groups of the bit fields is greater than or equal to a first value, and each of the groups of the bit fields includes at least one of: a time-frequency-domain-resource indication field, a resource-reservation-period indication field indicating a reservation period for each time-frequency-domain resource indicated by the time-frequency-domain-resource indication field, or a resource-reservation-period-number indication field indicating the number of reservation periods for time-frequency-domain resources indicated by the time-frequency-domain-resource indication field.

In a possible implementation, the number of the groups of the bit fields is determined according to the maximum number of retransmissions allowed by the current resource pool.

In a possible implementation, the number M2 of the groups of the bit fields is $$\left\lceil \frac{R-1}{2} \right\rceil$$

on condition that the time-frequency-domain-resource indication field indicates two time-frequency-domain resources, and the number M2 of the groups of the bit fields is $$\left\lceil \frac{R-1}{3} \right\rceil$$

on condition that the time-frequency-domain-resource indication field indicates three time-frequency-domain resources, where R is the maximum number of retransmissions allowed by the current resource pool.

In a possible implementation, on condition that the SCI format 0-2 includes no resource-reservation-period indication field, reservation periods for resources indicated by the SCI format 0-2 are the same as reservation periods for resources indicated by an SCI format 0-1 that schedules transmission of the SCI format 0-2, and the number of the reservation periods for the resources indicated by the SCI format 0-1 is the same as that of the reservation periods for the resources indicated by the resource-reservation-period-number indication field in the SCI format 0-2.

In a possible implementation, whether the SCI format 0-2 includes multiple groups of bit fields is indicated by second RRC signaling that is transmitted by the first terminal device to the second terminal device, or indicated by configured signaling or pre-configured signaling from the network device.

In a possible implementation, whether the SCI format 0-2 includes the multiple groups of the bit fields is indicated by the SCI format 0-1 that schedules transmission of the SCI format 0-2.

In a possible implementation, the SCI format 0-2 includes at least the resource-reservation-period-number indication filed.

In a possible implementation, whether the SCI format 0-2 includes the reservation-period-number indication field is indicated by second RRC signaling that is transmitted by the first terminal device to the second terminal device, or indicated by configured signaling or pre-configured signaling from the network device.

In a possible implementation, whether the SCI format 0-2 includes the reservation-period-number indication field is indicated by the SCI format 0-1 that schedules transmission of the SCI format 0-2.

The foregoing solution of the implementations of the disclosure is mainly illustrated from the viewpoint of interaction process of various network elements. It can be understood that, in order to implement the above functions, the terminal device includes hardware structures and/or software modules for performing the respective functions. Those skilled in the art should readily recognize that, in combination with the units and algorithmic operations of various examples illustrated in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the illustrated functions for each particular application, but such implementation should not be considered as beyond the scope of the present disclosure.

According to the implementations of the disclosure, functional units may be divided for the terminal device in accordance with the foregoing method examples. For example, each functional unit may be divided according to each function, and two or more functions may be integrated in one processing unit. The above-mentioned integrated unit can be implemented in the form of hardware or software program modules. It should be noted that the division of units in the implementations of the present disclosure is schematic, and is merely a logical function division, and there may be other division manners in actual implementation.

Figure 5:
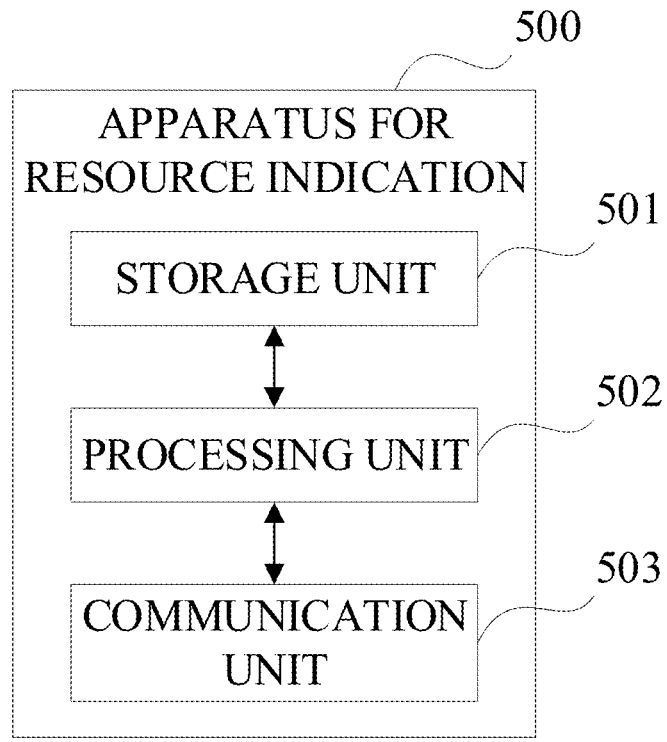
FIG. 5 is a block diagram illustrating function units of an apparatus for resource indication provided in implementations of the disclosure.

In the case of the integrated unit, FIG. 5 is a possible block diagram illustrating functional units of the apparatus for resource indication involved in the foregoing implementations. The apparatus 500 for resource indication is applied to a terminal device and includes a processing unit 502 and a communication unit 503. The processing unit 502 is configured to control and manage actions of the terminal device, for example, the processing unit 502 is configured to support the terminal device to perform the operations at 202 in FIG. 2A and/or other processes of the technology illustrated in the disclosure. The communication unit 503 is configured to support communication between the terminal device and other devices. The terminal device further includes a storage unit 501 configured to store program codes and data of the terminal device.

The processing unit 502 can be a processor or a controller, for example, a central processing unit (CPU), a general-purpose processor, a digital signal processor (DSP), an application specific integrated circuit (ASIC), a field programmable gate array (FPGA), other programmable logic devices, transistor logic devices, hardware components, or any combination thereof. Various exemplary logical blocks, modules, and circuits illustrated in conjunction with the disclosure may be achieved or implemented. The processor also may be a combination realizing computing functions, for example, a combination of one or more microprocessors, a combination of the DSP and the microprocessor, or the like. The communication unit 503 may be a communication interface, a transceiver, a transceiver circuit, or the like. The storage unit 501 may be a memory. When the processing unit 502 is the processor, the communication unit 503 is the communication interface, and the storage unit 501 is the memory, the terminal device involved in implementations of the disclosure may be the terminal device illustrated in FIG. 3.

In specific implementations, the processing unit 502 is configured to perform any of operations performed by the terminal device in the foregoing method implementations, and when performing data transmission such as transmitting, it is possible to invoke the communication unit 503 to complete corresponding operations, which will be illustrated below in detail.

The processing unit 502 is configured to control the communication unit 503 to transmit a shared resource set to a second terminal device through first signaling, where the shared resource set indicates transmission resources for SL communication.

In a possible implementation, the first signaling is first RRC signaling.

In a possible implementation, the shared resource set includes frequency-domain resources in a reservation time that exceeds a shortest reservation time and starts from a time point at which the first terminal device transmits the first RRC signaling.

In a possible implementation, on condition that the first terminal device reserves multiple frequency-domain resources in a resource reservation period, the shared resource set includes the multiple frequency-domain resources and frequency-domain resources same as the multiple frequency-domain resources in slots after the resource reservation period for the multiple frequency-domain resources.

In a possible implementation, a time interval from a time point at which the first terminal device determines a first frequency-domain resource in the multiple frequency-domain resources to a time point at which the first terminal device transmits the first RRC signaling is less than or equal to a maximum time interval. The first terminal device triggers resource reselection on condition that the first terminal device determines no resource for transmission of the first RRC signaling.

In a possible implementation, before transmitting the shared resource set to the second terminal device through the first signaling, the processing unit 502 is further configured to determine the shared resource set according to a first indication from a network device, where the shared resource set includes at least one of: at least one resource configured via type-1 CG or at least one resource configured via type-2 CG.

In a possible implementation, before transmitting the shared resource set to the second terminal device through the first signaling, the processing unit 502 is further configured to select the shared resource set from a resource pool according to channel detection information and periodically occupy same frequency-domain resources in the shared resource set.

In a possible implementation, before transmitting the shared resource set to the second terminal device through the first signaling, the processing unit 502 is further configured to determine an initial resource set according to a second indication from the network device, and determine the shared resource set according to the initial resource set, where the shared resource set is a subset of the initial resource set.

In a possible implementation, the initial resource set is represented as one or more resources configured via type-1 CG or a resource pool, and the shared resource set is represented as one or more resources configured via type-1 CG or a resource pool.

In a possible implementation, the shared resource set includes SL transmission resources currently used by the first terminal device and SL resources not used by the first terminal device.

In a possible implementation, the first signaling is SCI carried in a PSCCH.

In a possible implementation, the SCI includes at least one of: M1 time-frequency-domain-resource indication fields, where M1 is a positive integer; a resource-reservation-period indication field indicating a reservation period for each time-frequency-domain resource indicated by each time-frequency-domain-resource indication field; or a resource-reservation-period-number indication field indicating the number of reservation periods for time-frequency-domain resources indicated by each time-frequency-domain-resource indication filed.

In a possible implementation, each of the time-frequency-domain-resource indication fields includes 5 bits indicating a location of each of n slots, and $$\left\lceil \log_2\left(\frac{N_{subC}^{SL}(N_{subC}^{SL}+1)}{2}\right) \right\rceil$$

bits indicating a start location of a frequency-domain resource in each of the n slots and the number of sub-channels in the frequency-domain resource in each of the n slots, where n≤2. Alternatively, each of the time-frequency-domain-resource indication fields includes 9 bits indicating a location of each of m slots, and $$\left\lceil \log_2\left(\frac{N_{subC}^{SL}(N_{subC}^{SL}+1)(2N_{subC}^{SL}+1)}{6}\right)\right\rceil$$

bits indicating a start location of a frequency-domain resource in each of the m slots and the number of sub-channels in the frequency-domain resource in each of them slots, where m≤3, and $N_{subC}^{SL}$ represents the number of sub-channels in a current resource pool.

In a possible implementation, the number of the time-frequency-domain-resource indication fields is determined according to the maximum number of retransmissions allowed by the current resource pool.

In a possible implementation, the number M1 of the time-frequency-domain resource indication fields is $$\left\lceil \frac{R}{2} \right\rceil$$

on condition mat each of me time-frequency-domain-resource indication fields indicates two time-frequency-domain resources, and the number M1 of the time-frequency-domain resource indication fields is $$\left\lceil \frac{R}{3} \right\rceil$$

on condition that each of the time-frequency-domain-resource indication field indicates three time-frequency-domain resources, where R is the maximum number of retransmissions allowed by the current resource pool.

In a possible implementation, the total number of bits of the SCI is different from the number of bits of an SCI format 0-1. A size of time-frequency-domain resources occupied by the PSCCH carrying the SCI is different from that of time-frequency-domain resources occupied by a PSCCH carrying the SCI format 0-1.

In a possible implementation, bit fields in the SCI are the same as bit fields in an SCI format 0-1, and a size of the bit fields in the SCI is the same as that of time-frequency resources occupied by the PSCCH carrying the SCI.

In a possible implementation, the shared resource set includes SL transmission resources currently used by the first terminal device or a superset of the SL transmission resources currently used by the first terminal device.

In a possible implementation, the first signaling is an SCI format 0-2.

In a possible implementation, the SCI format 0-2 includes M2 groups of bit fields, M2 is a positive integer, the number of the groups of the bit fields is greater than or equal to a first value, and each of the groups of the bit fields includes at least one of: a time-frequency-domain-resource indication field, a resource-reservation-period indication field indicating a reservation period for each time-frequency-domain resource indicated by the time-frequency-domain-resource indication field, or a resource-reservation-period-number indication field indicating the number of reservation periods for time-frequency-domain resources indicated by the time-frequency-domain-resource indication field.

In a possible implementation, the number of the groups of the bit fields is determined according to the maximum number of retransmissions allowed by a current resource pool.

In a possible implementation, the number M2 of the groups of the bit fields is $$\left\lceil \frac{R-1}{2} \right\rceil$$

on condition that the time-frequency-domain-resource indication field indicates two time-frequency-domain resources, and the number M2 of the groups of the bit fields is $$\left\lceil \frac{R-1}{3} \right\rceil$$

on condition that the time-frequency-domain-resource indication field indicates three time-frequency-domain resources, where R is the maximum number of retransmissions allowed by the current resource pool.

In a possible implementation, on condition that the SCI format 0-2 includes no resource-reservation-period indication field, reservation periods for resources indicated by the SCI format 0-2 are the same as reservation periods for resources indicated by an SCI format 0-1 that schedules transmission of the SCI format 0-2, and the number of the reservation periods for the resources indicated by the SCI format 0-1 is the same as that of the reservation periods for the resources indicated by the resource-reservation-period-number indication field in the SCI format 0-2.

In a possible implementation, whether the SCI format 0-2 includes multiple groups of bit fields is indicated by second RRC signaling that is transmitted by the first terminal device to the second terminal device, or indicated by configured signaling or pre-configured signaling from the network device.

In a possible implementation, whether the SCI format 0-2 includes the multiple groups of the bit fields is indicated by the SCI format 0-1 that schedules transmission of the SCI format 0-2.

In a possible implementation, the SCI format 0-2 includes at least the resource-reservation-period-number indication filed.

In a possible implementation, whether the SCI format 0-2 includes the reservation-period-number indication field is indicated by second RRC signaling that is transmitted by the first terminal device to the second terminal device, or indicated by configured signaling or pre-configured signaling from the network device.

In a possible implementation, whether the SCI format 0-2 includes the reservation-period-number indication field is indicated by the SCI format 0-1 that schedules transmission of the SCI format 0-2.

Figure 6:
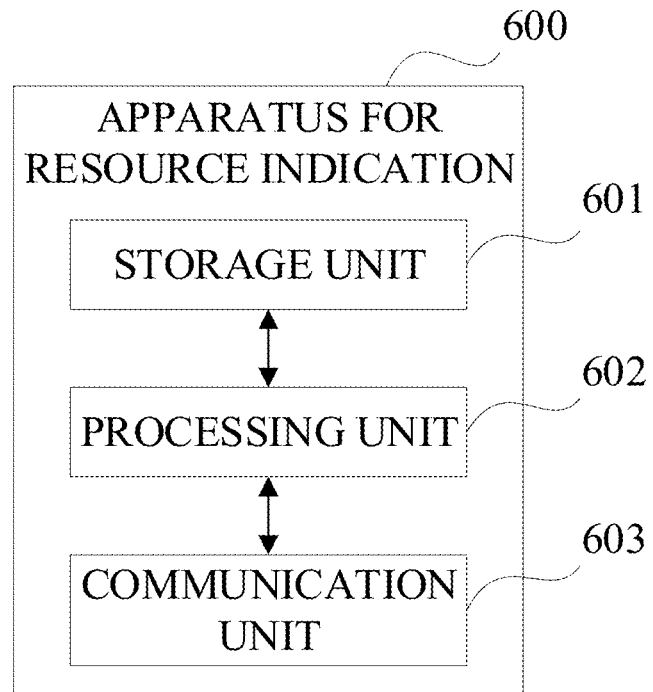
FIG. 6 is another block diagram illustrating function units of an apparatus for resource indication provided in implementations of the disclosure.

In the case of the integrated unit, FIG. 6 is a possible block diagram illustrating functional units of the apparatus for resource indication involved in the foregoing implementations. The apparatus 600 for resource indication is applied to a terminal device and includes a processing unit 602 and a communication unit 603. The processing unit 602 is configured to control and manage actions of the terminal device, for example, the processing unit 602 is configured to support the terminal device to perform the operations at 201 in FIG. 2A and/or other processes of the technology illustrated in the disclosure. The communication unit 603 is configured to support communication between the terminal device and other devices. The terminal device further includes a storage unit 601 configured to store program codes and data of the terminal device.

The processing unit 602 can be a processor or a controller, for example, a CPU, a general-purpose processor, a DSP, an ASIC, a FPGA, other programmable logic devices, transistor logic devices, hardware components, or any combination thereof. Various exemplary logical blocks, modules, and circuits illustrated in conjunction with the disclosure may be achieved or implemented. The processor also may be a combination of computing functions, for example, a combination of one or more microprocessors, a combination of the DSP and the microprocessor, or the like. The communication unit 603 may be a communication interface, a transceiver, a transceiver circuit, or the like. The storage unit 601 may be a memory. If the processing unit 602 is a processor, the communication unit 603 is a communication interface, and the storage unit 601 is a memory, the terminal device involved in implementations of the disclosure may be the terminal device illustrated in FIG. 4.

The processing unit 602 is configured to control the communication unit 603 to receive a shared resource set transmitted by a first terminal device through first signaling, where the shared resource set indicates transmission resources for SL communication.

In a possible implementation, the first signaling is first RRC signaling.

In a possible implementation, the shared resource set includes frequency-domain resources in a reservation time that exceeds a shortest reservation time and starts from a time point at which the first terminal device transmits the first RRC signaling.

In a possible implementation, on condition that in a resource reservation period multiple frequency-domain resources reserved by the first terminal device are included, the shared resource set includes the multiple frequency-domain resources and frequency-domain resources same as the multiple frequency-domain resources in slots after the resource reservation period for the multiple frequency-domain resources.

In a possible implementation, a time interval from a time point at which the first terminal device determines a first frequency-domain resource in the multiple frequency-domain resources to a time point at which the first terminal device transmits the first RRC signaling is less than or equal to a maximum time interval. The first terminal device triggers resource reselection on condition that the first terminal device determines no resource for transmission of the first RRC signaling.

In a possible implementation, the shared resource set includes SL transmission resources currently used by the first terminal device and SL resources not used by the first terminal device.

In a possible implementation, the first signaling is SCI carried in a PSCCH.

In a possible implementation, the SCI includes at least one of: M1 time-frequency-domain-resource indication fields, where M1 is a positive integer; a resource-reservation-period indication field indicating a reservation period for each time-frequency-domain resource indicated by each time-frequency-domain-resource indication field; or a resource-reservation-period-number indication field indicating the number of reservation periods for time-frequency-domain resources indicated by each time-frequency-domain-resource indication filed.

In a possible implementation, each of the time-frequency-domain-resource indication fields includes 5 bits indicating a location of each of n slots, and $$\left\lceil \log_2\left( \frac{N_{subC}^{SL}(N_{subC}^{SL}+1)}{2} \right) \right\rceil$$

bits indicating a start location of a frequency-domain resource in each of the n slots and the number of sub-channels in the frequency-domain resource in each of the n slots, where n≤2. Alternatively, each of the time-frequency-domain-resource indication fields includes 9 bits indicating a location of each of m slots, and $$\left\lceil \log_2\left( \frac{N_{subC}^{SL}(N_{subC}^{SL}+1)(2N_{subC}^{SL}+1)}{6} \right) \right\rceil$$

bits indicating a start location of a frequency-domain resource in each of the m slots and the number of sub-channels in the frequency-domain resource in each of them slots, where m≤3, and $N_{subC}^{SL}$ represents the number of sub-channels in a current resource pool.

In a possible implementation, the number of the time-frequency-domain-resource indication fields is determined according to the maximum number of retransmissions allowed by the current resource pool.

In a possible implementation, the number M1 of the time-frequency-domain resource indication fields is $$\left\lceil \frac{R}{2} \right\rceil$$

on condition that each of the time-frequency-domain-resource indication fields indicates two time-frequency-domain resources, and the number M1 of the time-frequency-domain resource indication fields is $$\left\lceil \frac{R}{3} \right\rceil$$

on condition that each of the time-frequency-domain-resource indication field indicates three time-frequency-domain resources, where R is the maximum number of retransmissions allowed by the current resource pool.

In a possible implementation, the total number of bits of the SCI is different from the number of bits of an SCI format 0-1. A size of time-frequency-domain resources occupied by the PSCCH carrying the SCI is different from that of time-frequency-domain resources occupied by a PSCCH carrying the SCI format 0-1.

In a possible implementation, bit fields in the SCI are the same as bit fields in the SCI format 0-1, and a size of the bit fields in the SCI is the same as that of time-frequency resources occupied by the PSCCH carrying the SCI.

In a possible implementation, on condition that the second terminal device receives third RRC signaling from the first terminal device, and the third RRC signaling indicates that reserved bits of the SCI format 0-1 are in an activated state, or on condition that configured signaling or pre-configured signaling from the network device indicates that the reserved bits of the SCI format 0-1 in the current resource pool are in the activated state, the second terminal device takes the reserved bits as the number of reservation periods for time-frequency-domain reservation resources.

In a possible implementation, the shared resource set includes SL transmission resources currently used by the first terminal device or a superset of the SL transmission resources currently used by the first terminal device.

In a possible implementation, the first signaling is an SCI format 0-2.

In a possible implementation, the SCI format 0-2 includes M2 groups of bit fields, M2 is a positive integer, the number of the groups of the bit fields is greater than or equal to a first value, and each of the groups of the bit fields includes at least one of: a time-frequency-domain-resource indication field, a resource-reservation-period indication field indicating a reservation period for each time-frequency-domain resource indicated by the time-frequency-domain-resource indication field, or a resource-reservation-period-number indication field indicating the number of reservation periods for time-frequency-domain resources indicated by the time-frequency-domain-resource indication field.

In a possible implementation, the number of the groups of the bit fields is determined according to the maximum number of retransmissions allowed by a current resource pool.

In a possible implementation, the number M2 of the groups of the bit fields is $$\left\lceil \frac{R-1}{2} \right\rceil$$

on condition that the time-frequency-domain-resource indication field indicates two time-frequency-domain resources, and the number M2 of the groups of the bit fields is $$\left\lceil \frac{R-1}{3} \right\rceil$$

on condition that the time-frequency-domain-resource indication field indicates three time-frequency-domain resources, where R is the maximum number of retransmissions allowed by the current resource pool.

In a possible implementation, on condition that the SCI format 0-2 includes no resource-reservation-period indication field, reservation periods for resources indicated by the SCI format 0-2 are the same as reservation periods for resources indicated by an SCI format 0-1 that schedules transmission of the SCI format 0-2, and the number of the reservation periods for the resources indicated by the SCI format 0-1 is the same as that of the reservation periods for the resources indicated by the resource-reservation-period-number indication field in the SCI format 0-2.

In a possible implementation, whether the SCI format 0-2 includes multiple groups of bit fields is indicated by second RRC signaling that is transmitted by the first terminal device to the second terminal device, or indicated by configured signaling or pre-configured signaling from the network device.

In a possible implementation, whether the SCI format 0-2 includes the multiple groups of the bit fields is indicated by the SCI format 0-1 that schedules transmission of the SCI format 0-2.

In a possible implementation, the SCI format 0-2 includes at least the resource-reservation-period-number indication filed.

In a possible implementation, whether the SCI format 0-2 includes the reservation-period-number indication field is indicated by second RRC signaling that is transmitted by the first terminal device to the second terminal device, or indicted by configured signaling or pre-configured signaling from the network device.

In a possible implementation, whether the SCI format 0-2 includes the reservation-period-number indication field is indicated by the SCI format 0-1 that schedules transmission of the SCI format 0-2.

A chip is further provided in implementations of the disclosure. The chip includes a processor configured to invoke and execute a computer program stored in a memory, to enable a device equipped with the chip to execute some or all of the operations performed by the terminal device in the above-mentioned method implementations.

A computer-readable storage medium is further provided in implementations of the disclosure. The computer-readable storage medium is configured to store a computer program used for performing electronic data interchange, where the computer program enables a computer to execute some or all of the operations performed by the terminal device in the above-mentioned method implementations.

A computer-readable storage medium is further provided in implementations of the disclosure. The computer-readable storage medium is configured to store a computer program used for performing electronic data interchange, where the computer program enables a computer to execute some or all of the operations performed by the network device in the above-mentioned method implementations.

A computer program product is further provided in implementations of the disclosure. The computer program product includes a computer program which can be operated to enable a computer to execute some or all of the operations performed by the terminal device in the above-mentioned method implementations. The computer program product may be a software installation package.

The algorithmic operations and the method illustrated in implementations may be implemented as hardware, or may be implemented by a processor performing software instructions. The software instructions may be composed with corresponding software modules. The software module can be stored in a storage medium such as a random access memory (RAM), a flash memory, a read only memory (ROM), an erasable programmable read-only memory (EPROM), an electrically erasable programmable read-only memory (EEPROM), a register, a hard disc, a mobile hard disc, or a compact disc read-only memory (CD-ROM), or in storage media with any other forms known in this field. An exemplary storage medium is coupled to the processor, so that the processor can read information from the storage medium and can write information to the storage medium. Of course, the storage medium can also be a part of the processor. The processor and the storage medium may be located in an ASIC. In addition, the ASIC may be located in an access network device, a target network device, or a core network device. Of course, the processor and the storage medium may also be presented as discrete components in the access network device, the target network device, or the core network device.

Those skilled in the art can appreciate that, in the above-mentioned one or more implementations, all or part of the illustrated functions can be implemented through software, hardware, firmware, or any other combination thereof.

When implemented by software, all or part of the above implementations can be implemented in the form of a computer program product. The computer program product includes one or more computer instructions. When the computer instructions are loaded and executed on a computer, all or part of the processes or functions of the implementations of the disclosure are performed. The computer can be a general-purpose computer, a special-purpose computer, a computer network, or other programmable apparatuses. The computer instructions can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer-accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

The above-mentioned implementations provide further details of the purpose, technical solutions and beneficial effects of the implementations of this disclosure. It can be understood that, the above is only specification implementation manners of the implementations of the disclosure and is not intended to limit the scope of protection of the implementations of the disclosure. Any modification, equivalent replacements and improvement made on the basis of the technical solution of the implementations of the disclosure shall be included in the scope of protection of the implementations of the disclosure.

What is claimed is:

1. A method for resource indication, comprising:
transmitting, by a first terminal device, a shared resource set to a second terminal device through first signaling, the shared resource set indicating transmission resources for sidelink (SL) communication;
wherein the first signaling is a sidelink control information (SCI) format 0-2;
wherein the SCI format 0-2 comprises M2 groups of bit fields, M2 is a positive integer, a number of the M2 groups of the bit fields is greater than or equal to a first value, and each of the M2 groups of the bit fields comprises at least one of:
a time-frequency-domain-resource indication field;
a resource-reservation-period indication field indicating a reservation period for each time-frequency-domain resource indicated by the time-frequency-domain-resource indication field; or
a resource-reservation-period-number indication field indicating number of reservation periods for time-frequency-domain resources indicated by the time-frequency-domain-resource indication field.

2. The method of claim 1, wherein before transmitting, by the first terminal device, the shared resource set to the second terminal device through the first signaling, the method further comprises:
determining, by the first terminal device, the shared resource set according to a first indication from a network device, wherein the shared resource set comprises at least one of: at least one resource configured via type-1 configured grant (CG) or at least one resource configured via type-2 CG.

3. The method of claim 1, wherein before transmitting, by the first terminal device, the shared resource set to the second terminal device through the first signaling, the method further comprises:
determining, by the first terminal device, an initial resource set according to a second indication from a network device; and
determining, by the first terminal device, the shared resource set according to the initial resource set, wherein the shared resource set is a subset of the initial resource set.

4. The method of claim 3, wherein the initial resource set is represented as one or more resources configured via type-1 CG or a resource pool, and the shared resource set is represented as one or more resources configured via the type-1 CG or the resource pool.

5. The method of claim 1, wherein the shared resource set comprises SL transmission resources currently used by the first terminal device or a superset of the SL transmission resources currently used by the first terminal device.

6. The method of claim 1, wherein whether the SCI format 0-2 comprises a plurality of groups of bit fields is indicated by an SCI format 0-1 that schedules transmission of the SCI format 0-2.

7. A method for resource indication, comprising:
receiving, by a second terminal device, a shared resource set transmitted by a first terminal device through first signaling, the shared resource set indicating transmission resources for sidelink (SL) communication;
wherein the first signaling is a sidelink control information (SCI) format 0-2;
wherein the SCI format 0-2 comprises M2 groups of bit fields, M2 is a positive integer, a number of the M2 groups of the bit fields is greater than or equal to a first value, and each of the M2 groups of the bit fields comprises at least one of:
a time-frequency-domain-resource indication field;
a resource-reservation-period indication field indicating a reservation period for each time-frequency-domain resource indicated by the time-frequency-domain-resource indication field; or
a resource-reservation-period-number indication field indicating number of reservation periods for time-frequency-domain resources indicated by the time-frequency-domain-resource indication field.

8. The method of claim 7, wherein the shared resource set comprises SL transmission resources currently used by the first terminal device or a superset of the SL transmission resources currently used by the first terminal device.

9. The method of claim 7, wherein whether the SCI format 0-2 comprises a plurality of groups of bit fields is indicated by an SCI format 0-1 that schedules transmission of the SCI format 0-2.

10. A terminal device comprising:
a transceiver;
a processor; and
a memory storing a computer program;
wherein the computer program being executed by the processor to cause the transceiver to:
transmit a shared resource set to another terminal device through first signaling, the shared resource set indicating transmission resources for sidelink (SL) communication;

wherein the first signaling is a sidelink control information (SCI) format 0-2;

wherein the SCI format 0-2 comprises M2 groups of bit fields, M2 is a positive integer, a number of the M2 groups of the bit fields is greater than or equal to a first value, and each of the M2 groups of the bit fields comprises at least one of:

a time-frequency-domain-resource indication field;

a resource-reservation-period indication field indicating a reservation period for each time-frequency-domain resource indicated by the time-frequency-domain-resource indication field; or a resource-reservation-period-number indication field indicating number of reservation periods for time-frequency-domain resources indicated by the time-frequency-domain-resource indication field.

11. The terminal device of claim 10, wherein the computer program is further executed by the processor to cause the processor to determine the shared resource set according to a first indication from a network device, wherein the shared resource set comprises at least one of: at least one resource configured via type-1 configured grant (CG) or at least one resource configured via type-2 CG.

12. The terminal device of claim 10, wherein the computer program is further executed by the processor to cause the processor to determine an initial resource set according to a second indication from a network device, and determine the shared resource set according to the initial resource set, wherein the shared resource set is a subset of the initial resource set.

13. The terminal device of claim 10, wherein the shared resource set comprises SL transmission resources currently used by the terminal device or a superset of the SL transmission resources currently used by the terminal device.

14. The terminal device of claim 10, wherein whether the SCI format 0-2 comprises a plurality of groups of bit fields is indicated by an SCI format 0-1 that schedules transmission of the SCI format 0-2.

* * * * *